United States Patent
Zhou

(10) Patent No.: US 8,166,825 B2
(45) Date of Patent: May 1, 2012

(54) METHOD AND APPARATUS FOR NOISE REDUCTION IN ULTRASOUND DETECTION

(75) Inventor: Gan Zhou, Plano, TX (US)

(73) Assignee: Tea Time Partners, L.P., Rockwall, TX (US)

( * ) Notice: Subject to any disclaimer, the term of this patent is extended or adjusted under 35 U.S.C. 154(b) by 251 days.

(21) Appl. No.: 12/761,825

(22) Filed: Apr. 16, 2010

(65) Prior Publication Data

US 2010/0199773 A1 Aug. 12, 2010

Related U.S. Application Data

(63) Continuation-in-part of application No. 11/927,889, filed on Oct. 30, 2007, now Pat. No. 7,810,395.

(60) Provisional application No. 61/240,994, filed on Sep. 9, 2009, provisional application No. 61/254,560, filed on Oct. 23, 2009.

(51) Int. Cl.
*G01H 9/00* (2006.01)
*G01B 9/02* (2006.01)
(52) U.S. Cl. .............. 73/655; 73/649; 356/491
(58) Field of Classification Search .......... 73/655, 73/649; 356/491, 364
See application file for complete search history.

(56) References Cited

U.S. PATENT DOCUMENTS

| | | | |
|---|---|---|---|
| 4,019,818 A | 4/1977 | Vilkomerson | |
| 4,379,633 A | 4/1983 | Bickel et al. | |
| 4,436,425 A | 3/1984 | Cole | |
| 4,587,972 A | 5/1986 | Morantte, Jr. | |
| 4,659,224 A | 4/1987 | Monchalin | |
| 4,887,605 A | 12/1989 | Angelsen et al. | |
| 4,977,546 A | 12/1990 | Flatley et al. | |
| 5,218,418 A | 6/1993 | Layton | |
| 5,313,266 A | 5/1994 | Keolian et al. | |
| 5,517,303 A * | 5/1996 | Cole et al. ............... | 356/479 |
| 5,561,522 A * | 10/1996 | Rapoport et al. ........ | 356/477 |
| 5,684,592 A | 11/1997 | Mitchell et al. | |
| 5,726,444 A | 3/1998 | Drummond | |
| 5,835,642 A | 11/1998 | Gelikonov et al. | |
| 5,894,531 A | 4/1999 | Alcoz | |
| 5,909,279 A | 6/1999 | Pepper et al. | |

(Continued)

FOREIGN PATENT DOCUMENTS

GB 2407154 A 4/2005

OTHER PUBLICATIONS

Paul C. Beard, et al.,"Characterization of a Polymer Film Optical Fiber Hydrophone for Use in the Range 1 to 20 MHz: A Comparison with PVDF Needle and Membrane Hydrophones;"IEEE Transactions on Ultrasonics, Ferroelectrics, and Frequency Control, vol. 47, No. 1, Jan. 2000, pp. 256-264.

*Primary Examiner* — J M Saint Surin

(57) ABSTRACT

Method and apparatus for noise reduction in ultrasound detection with the steps of: an optical interferometer having a reference arm and a signal arm that includes a polarization-maintaining probing fiber having a reflective coating at a distal end, a way to couple the probing fiber to ultrasound, a way to generate two output beams from the interferometer, a device to modulate the polarization state of the light in the probing fiber, and a detection mechanism responsive to the ultrasonic signals at the distal tip of the probing fiber.

23 Claims, 8 Drawing Sheets

U.S. PATENT DOCUMENTS

| | | | |
|---|---|---|---|
| 6,078,397 A * | 6/2000 | Monchalin et al. | 356/503 |
| 6,120,516 A | 9/2000 | Selmon et al. | |
| 6,222,970 B1 | 4/2001 | Wach et al. | |
| 6,346,985 B1 | 2/2002 | Hall | |
| 6,522,797 B1 | 2/2003 | Siems et al. | |
| 6,778,279 B2 * | 8/2004 | Lange et al. | 356/483 |
| 6,819,432 B2 * | 11/2004 | Pepper et al. | 356/498 |
| 6,973,223 B2 * | 12/2005 | Huang et al. | 385/11 |
| 7,068,867 B2 | 6/2006 | Adoram et al. | |
| 7,095,505 B1 | 8/2006 | Beard et al. | |
| 7,262,861 B1 | 8/2007 | Pepper et al. | |
| 2001/0055435 A1 | 12/2001 | Biagi et al. | |
| 2006/0241572 A1 | 10/2006 | Zhou | |
| 2008/0229837 A1 | 9/2008 | Zhou | |

* cited by examiner

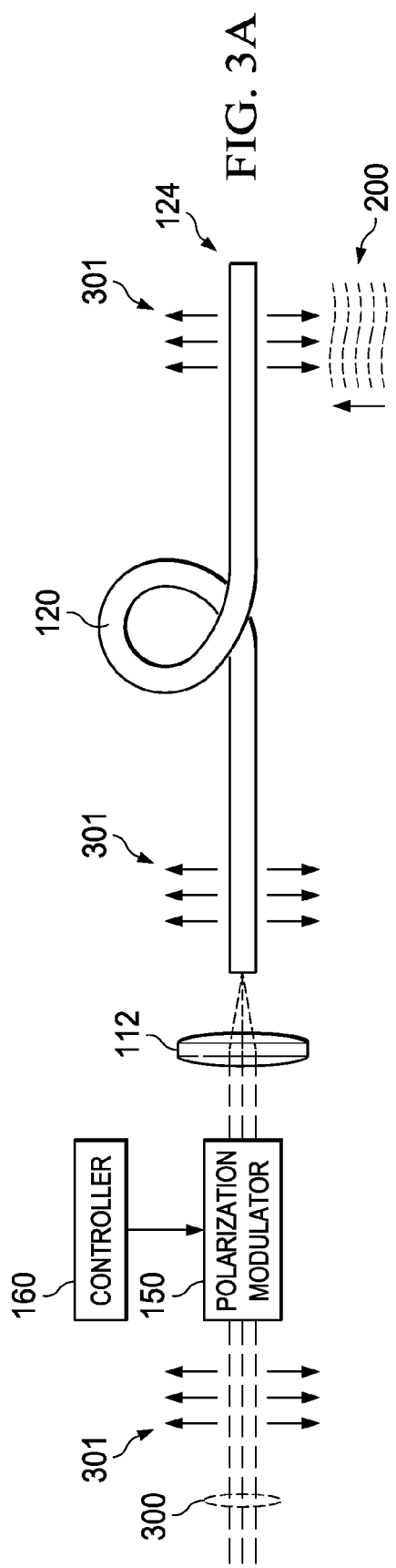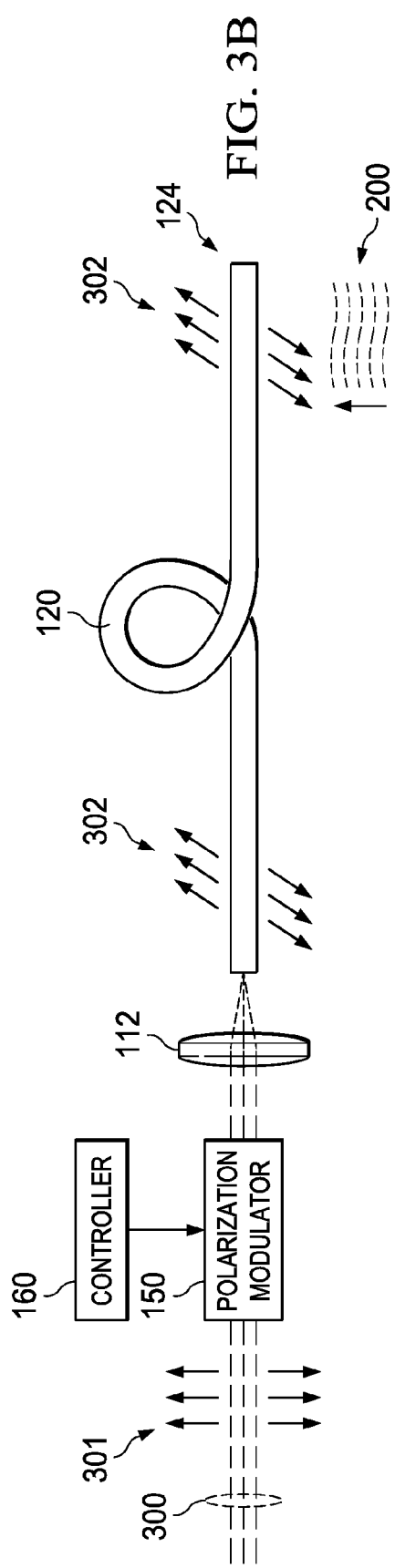

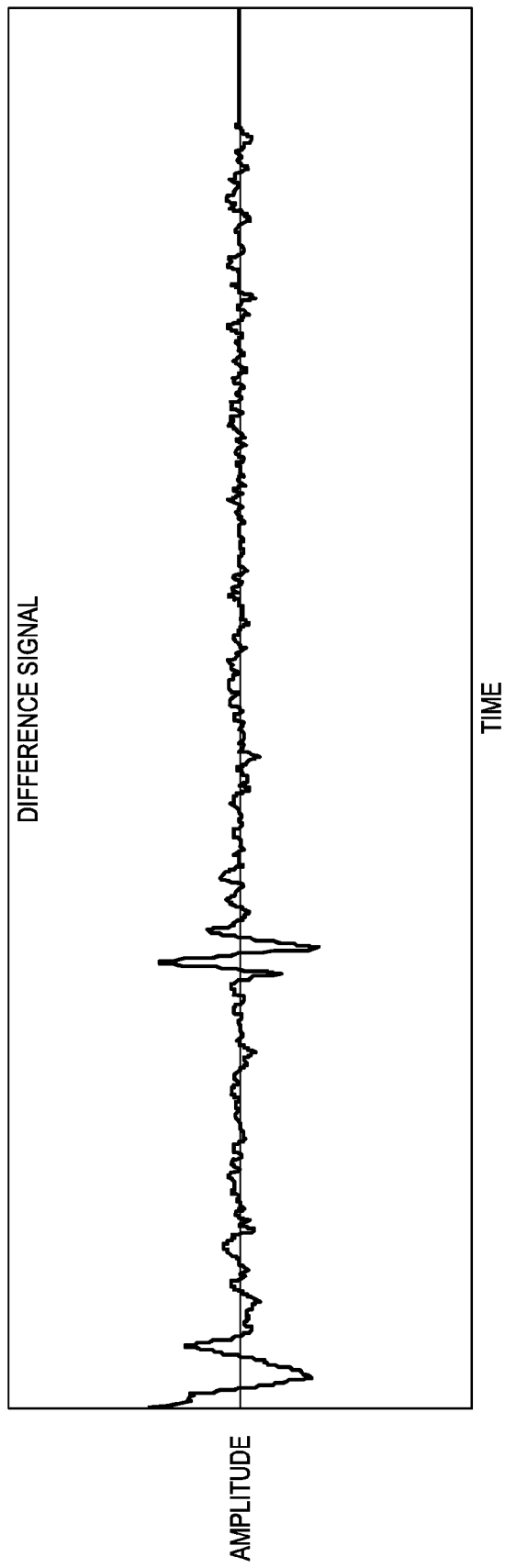

METHOD AND APPARATUS FOR NOISE REDUCTION IN ULTRASOUND DETECTION

CROSS-REFERENCE TO RELATED APPLICATION

This application is a continuation-in-part of U.S. application Ser. No. 11/927,889, filed by Zhou on Oct. 30, 2007, now U.S. Pat. No. 7,810,395 entitled "Ultrasonic Pressure Sensor and Method of Operating the Same." This application also claims the benefit of U.S. Provisional Application Ser. No. 61/240,994, filed by Zhou on Sep. 9, 2009, entitled "Method and Apparatus for Noise Reduction in Ultrasound Detection," and U.S. Provisional Application Ser. No. 61/254,560, filed by Zhou on Oct. 23, 2009, entitled "Method and Apparatus for Noise Reduction in Ultrasound Detection." All of these applications are commonly assigned with this application and incorporated herein by reference.

TECHNICAL FIELD

This application is directed, in general, to ultrasound sensors and, more specifically, to a method and apparatus for noise reduction in ultrasound detection.

BACKGROUND

An ultrasonic pressure sensor measures ultrasonic pressure and converts it into an electric voltage signal. These sensors are used widely in a variety of applications ranging from non-destructive testing of materials, marine biology, to medical imaging. In medical imaging, an ultrasonic transducer emits a high frequency pulse into a tissue, and acoustic echoes from the tissue are received by an ultrasonic pressure sensor which is typically implemented on the same transducer. Such a pulse-echo technique can help synthesize a gray-scale tomographic image of tissue's mechanical (or acoustic) properties. One of the most successful ultrasonic imaging devices today is the intravascular ultrasound, or IVUS.

Piezoelectric materials, such as lead zirconate titanate (PZT) or polyvinylidene difluoride (PVDF), have been used to make ultrasonic pressure sensors for many applications. PZT is a ceramic polycrystal with an inherent grain size that makes it difficult to machine and package to small dimensions unless it is attached to a larger substrate. PVDF, which is a polymer, must be electrically poled before it exhibits piezoelectricity, and its sensitivity is lower than that of PZT. Furthermore, the piezoelectric signal is a very small electric voltage that is subject to transmission line loss and electromagnetic interference. For transmission over a long distance such as from a catheter's distal end to its proximal end, the piezoelectric signals typically must be shielded by small coaxial cables and pre-amplified by a chip incorporated near the tip of the catheter. The need to shield and pre-amplify signals makes it hard to construct piezoelectric sensors with a relatively small profile.

Capacitive ultrasonic pressure sensors are being developed by several companies, and they have some interesting properties. They are a type of microelectromechanical systems (MEMS) device fabricated using silicon processing technologies developed in the semiconductor industry. However, these devices are costly to make, and reliability issues are associated with the need to forward-bias the sensing capacitors.

Optical ultrasonic pressure sensors have been proposed and studied by several research groups around the world. In a design described in Beard, et al., "Characterization of a Polymer Film Optical Fibre Hydrophone for the Measurement of Ultrasound Fields for Use in the Range 1-30 MHz: a Comparison with PVDF Needle and Membrane Hydrophones," IEEE Transactions on Ultrasonics, Ferroelectrics and Frequency Control, Vol. 47, No. 1, January 2000, a thin Fabry-Perot etalon is formed on the distal tip of an optical fiber. Laser light is launched into the fiber from a proximal end of the optical fiber and is subsequently reflected back by the etalon and received by a photodetector. Ultrasonic waves interacting with the distal end of the fiber modulates the cavity length of the etalon and causes a change in the reflected light intensity. For this sensor to function properly, the thickness of the polymer constituting the etalon must be controlled to a very high precision during fabrication, which is difficult to do. Furthermore, changes in application environment such as temperature and pressure can significantly alter the properties of the etalon and negatively impact sensor performance. In addition, the fiber optic sensor typically exhibits undesirable ringing or reverberations due to the structure of the sensor that distorts the frequency response. Such reverberations are also problematic in IVUS applications, because it degrades longitudinal image resolution, and it causes a large amount of so-called "ringdown" effect that makes it difficult to image objects close to the surface of IVUS catheter.

SUMMARY

One aspect provides an ultrasonic sensor. In one embodiment, the sensor includes: (1) an optical interferometer having an input and two outputs, (2) a polarization-maintaining probing fiber having a reflective coating at a distal end thereof, (3) a polarization modulator coupled between the input and a proximal end of the probing fiber and (4) a photodetector coupled to the two outputs and configured to derive an electronic signal that varies based on an ultrasonic signal received at the distal end.

Another aspect provides a method of sensing an ultrasonic signal. In one embodiment, the method includes: (1) providing laser light to an input of an optical interferometer, the optical interferometer also having two outputs, (2) modulating a polarization state of the laser light, (3) causing the laser light to enter a polarization-maintaining probing fiber, reflect off a reflective coating at a distal end thereof and (4) obtaining an electronic signal based on optical signals from the two outputs that represents an ultrasonic signal received at the distal end.

Yet another aspect provides an ultrasonic sensor. In one embodiment, the sensor includes: (1) an optical interferometer having an input, a reference arm, a signal arm and two outputs, (2) a polarization-maintaining probing fiber having a reflective coating at a distal end thereof, (3) a focusing lens coupled to the signal arm, (4) a polarization modulator coupled between the input and a proximal end of the probing fiber and (5) a photodetector coupled to the two outputs configured to provide light having substantially orthogonal polarizations, the photodetector configured to derive an electronic signal that varies based on an ultrasonic signal received at the distal end.

BRIEF DESCRIPTION

Reference is now made to the following descriptions taken in conjunction with the accompanying drawings, in which:

FIGS. 3A and 3B are diagrams of one embodiment of an ultrasonic sensor constructed according to the principles of the invention;

Figure 5:
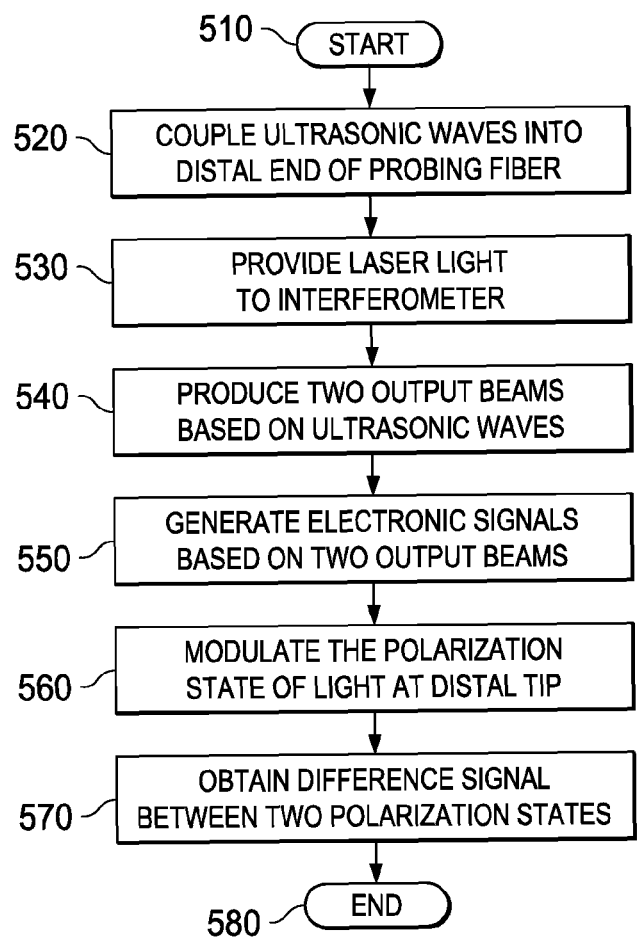
Figure 4A:
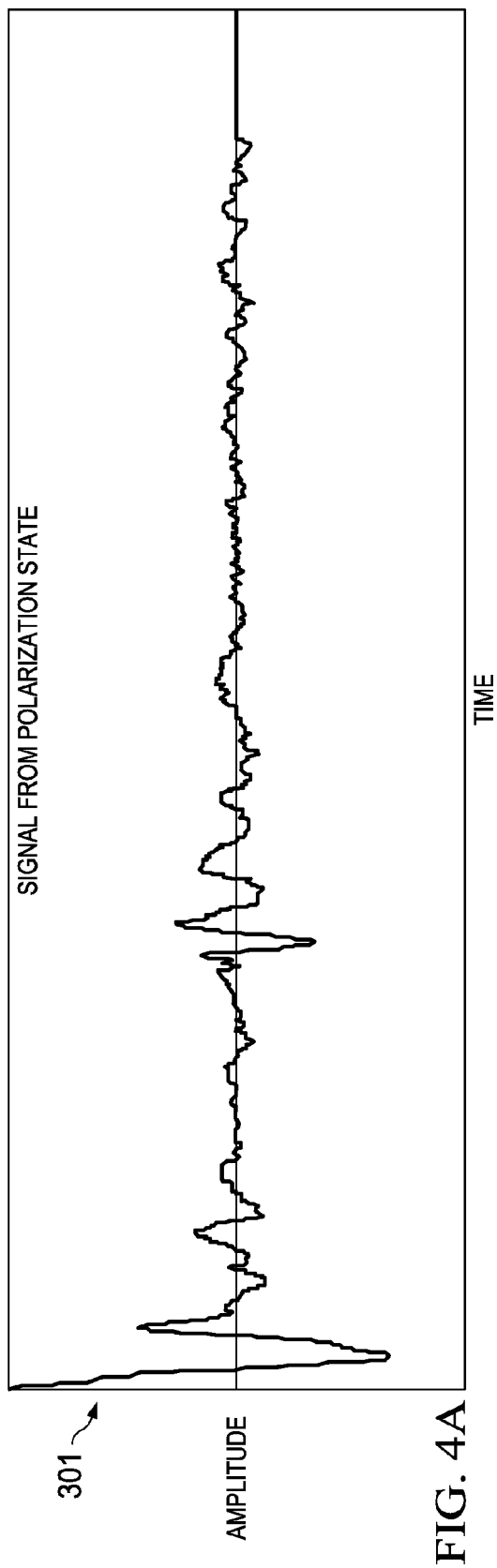
Figure 4B:
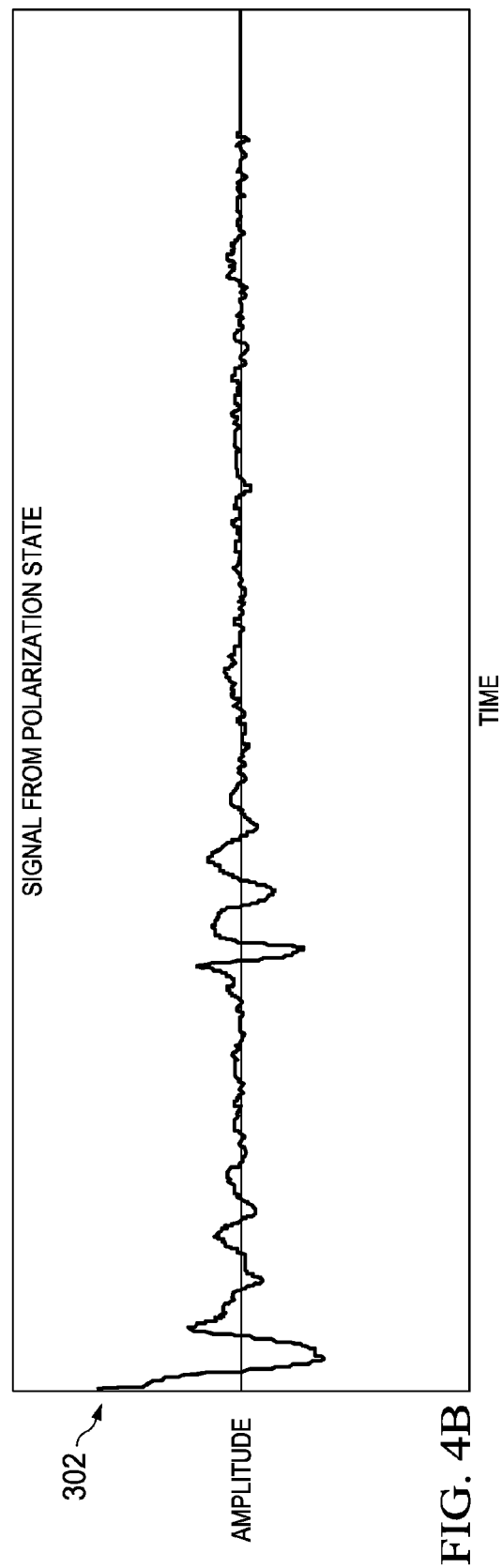
Figure 6:
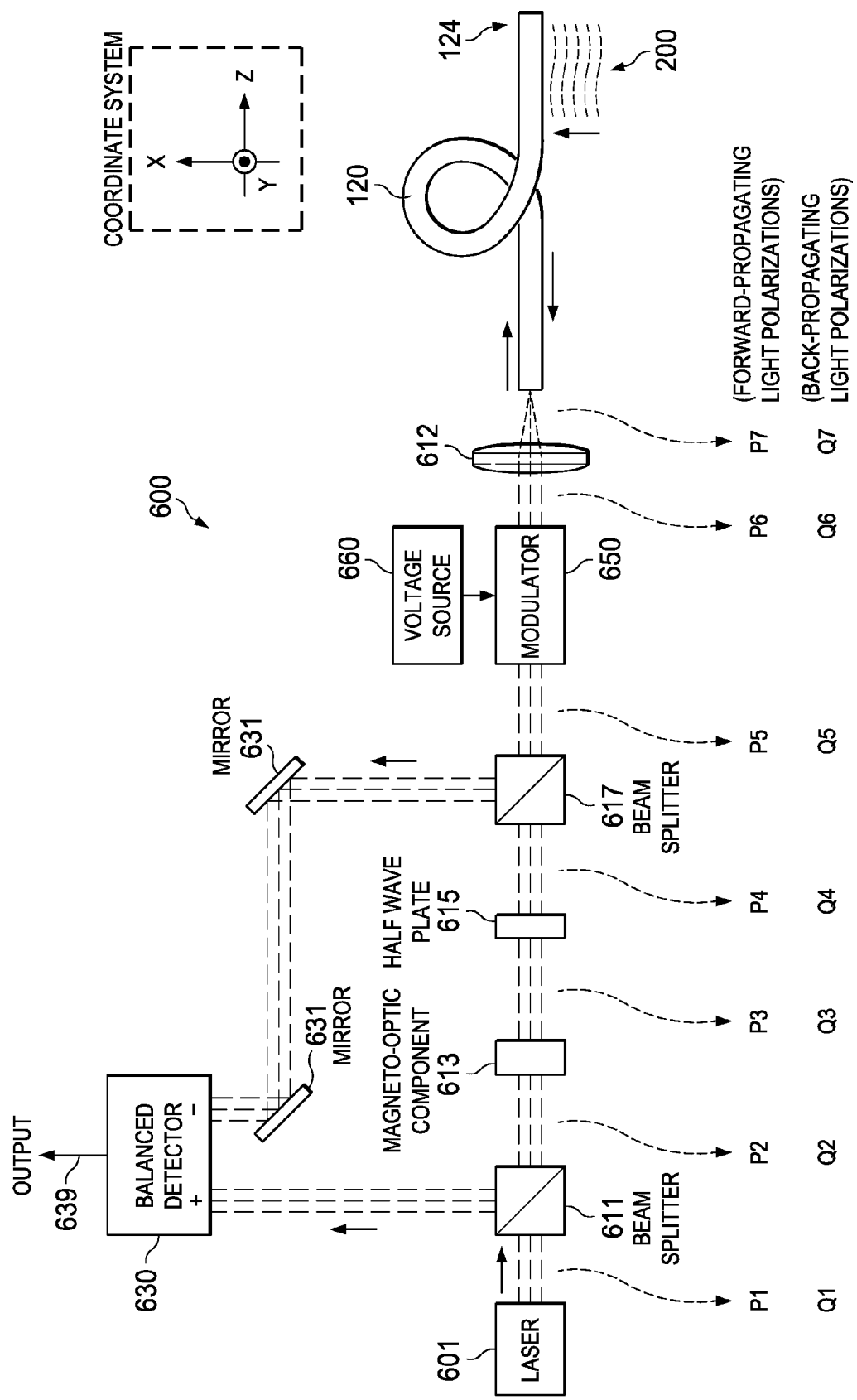
Figure 7:
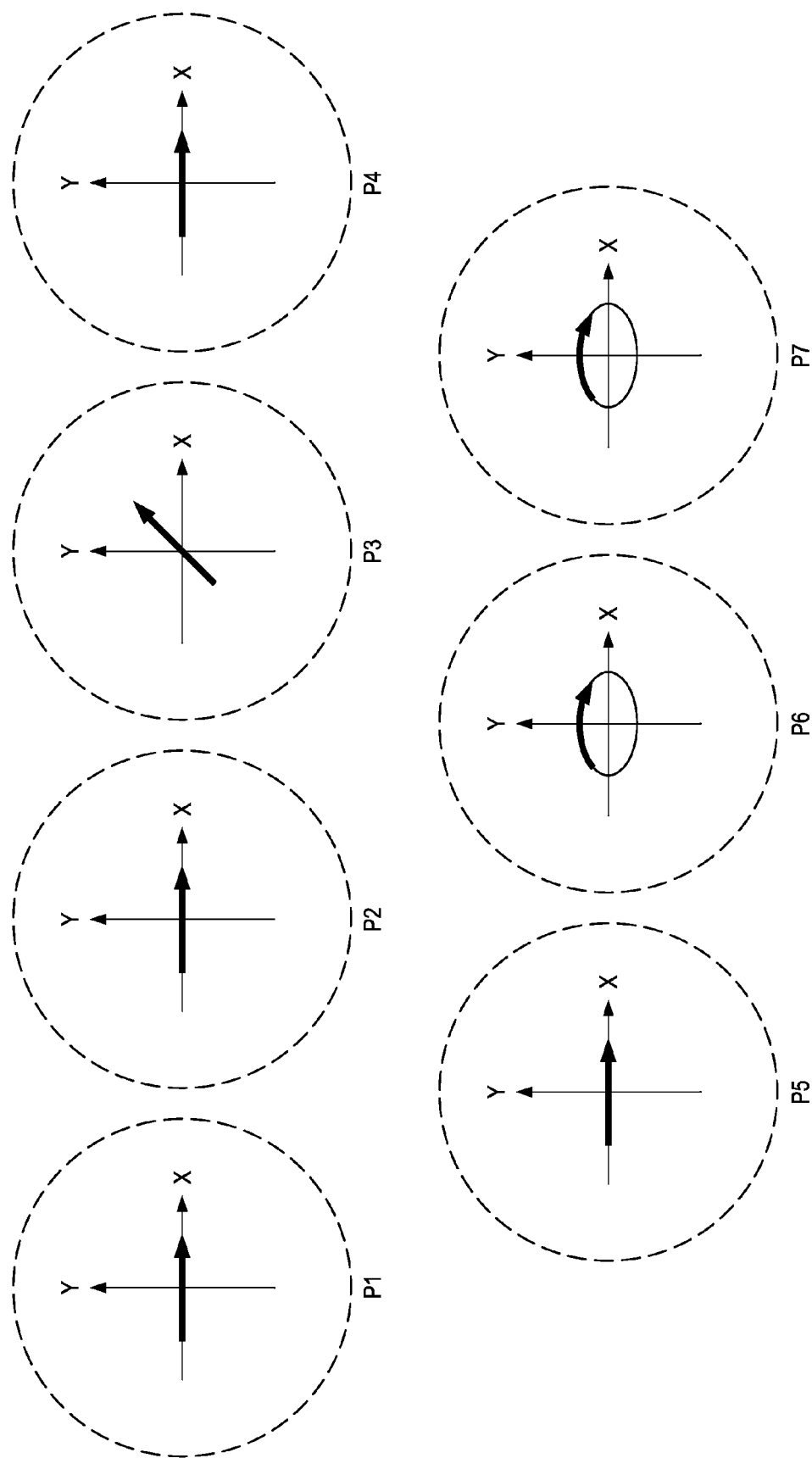
Figure 8:
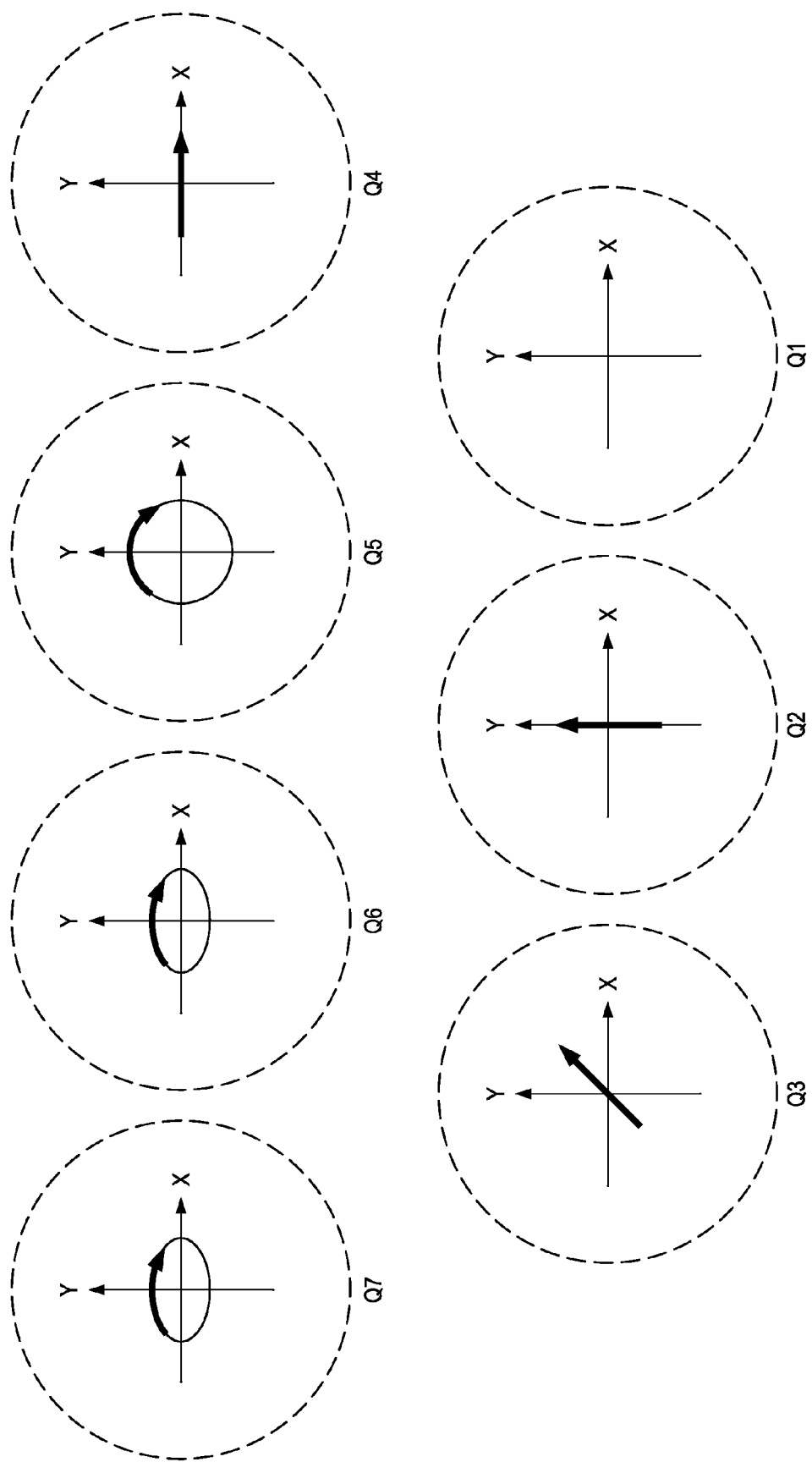

FIGS. 4A-C are diagrams illustrating a way in which noise can be reduced in the ultrasonic sensor of FIGS. 3A and 3B;

FIG. 5 illustrates a flow diagram of one embodiment of a method of detecting an ultrasonic wave carried out according to the principles of the invention;

FIG. 6 is a diagram of another embodiment of an ultrasonic sensor constructed according to the principles of the invention, along with a diagram of a Cartesian coordinate system;

FIG. 7 is a diagram of one embodiment of the polarization states of forward-propagating light at various locations in the ultrasonic sensor of FIG. 6; and FIG. 8 is a diagram of one embodiment of polarization states of back-propagating light at various locations in the ultrasonic sensor of FIG. 6.

DETAILED DESCRIPTION

Described herein are various embodiments of a method and apparatus for noise reduction in ultrasound detection. Those skilled in the art should understand, however, that the invention in its broadest form may be embodied in ways that this Detailed Description may not set forth. Therefore, specific details disclosed herein are not to be interpreted as limiting, but rather as a basis for the claims and as a representative basis for teaching one skilled in the art to employ the invention in virtually any system, structure or manner.

Figure 1:
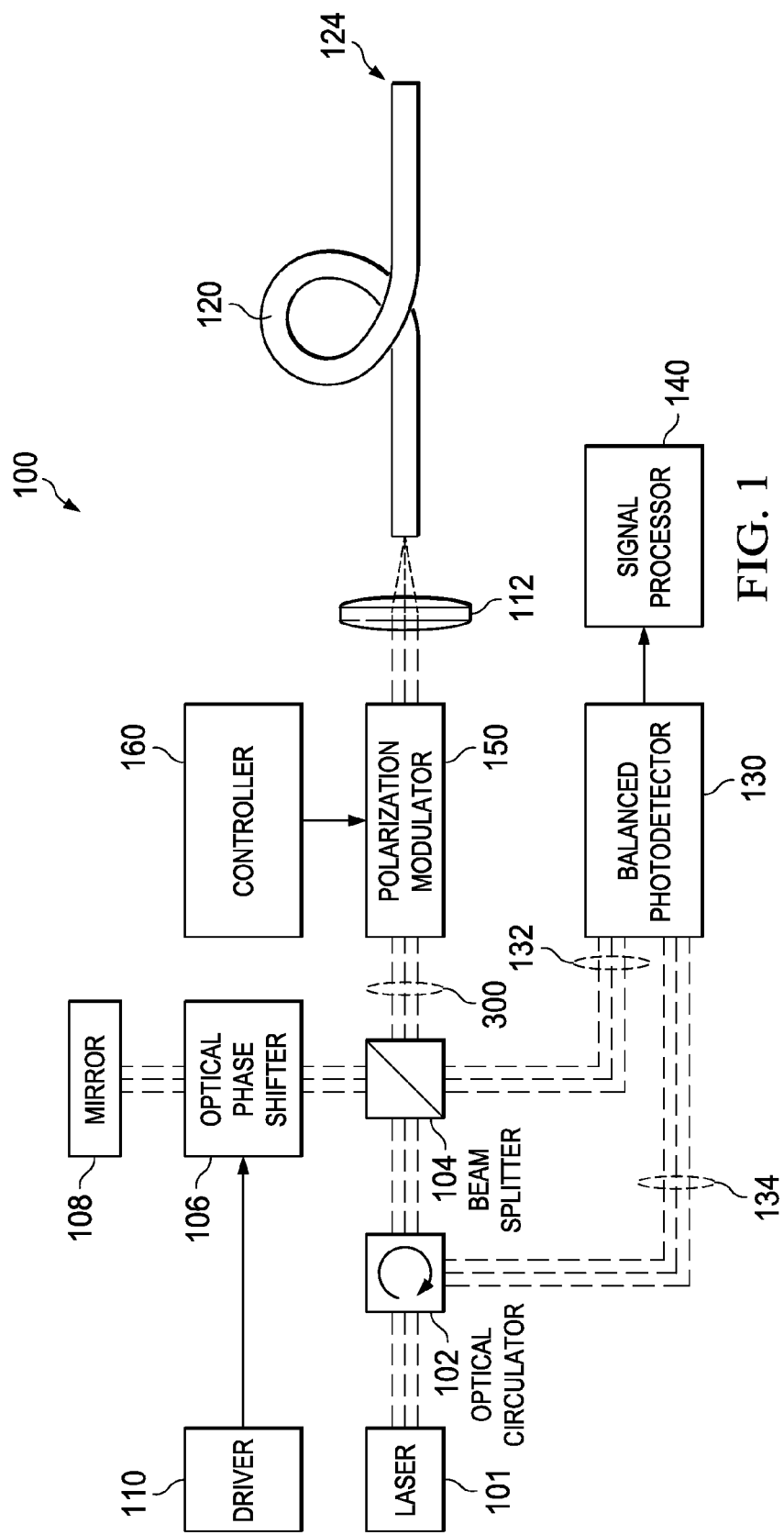
FIG. 1 is a schematic diagram of one embodiment of an ultrasonic sensor constructed according to the principles of the invention.

FIG. 1 illustrates a schematic view of one embodiment of an ultrasound sensor 100 constructed according to the principles of the invention. The ultrasound sensor 100 employs the structure of a Michelson interferometer. Coherent (e.g., laser) light from a laser 101 provides the input to the interferometer. The light passes through an optical circulator 102, a beamsplitter 104, a polarization modulator 150, a focusing lens 112, and couples into a polarization-maintaining optical fiber (also called a PM probing fiber) 120. The PM optical fiber 120 serves as the probe for the ultrasound sensor 100; for this reason the optical fiber 120 will be referred to hereinafter as a probing fiber 120. The polarization modulator 150 can modulate the polarization state of the laser light passing through it. It is driven by a controller 160 that provides the necessary electrical signal(s) for it to function. The beamsplitter 104 also splits off part of the laser light and directs it to pass through an optical phase shifter 106 and reflect off a mirror 108. A distal (or far) end 124 of the probing fiber 120 has a reflective coating at the tip of the distal end 124, so that laser light reaching the distal end 124 is substantially reflected back. The two reflected beams of light from the mirror 108 and from the fiber distal end 124 back-propagate and are combined in the beamsplitter 104. The beamsplitter 104 reflects a part of the combined beam (producing an output beam 132) and passes another part of the combined beam which thereafter enters the optical circulator 102 and is subsequently routed to an exit port thereof (producing an output beam 134). The optical circulator 102 may be a commercially available optical isolator (e.g., Model No. IO-3-532-VHP from the OFR division of Thorlabs, Inc., of Newton, N.J., with its "reject" port acting as the exit port). A balanced photodetector 130 receives both of the output beams 132, 134. A signal processor 140 acquires, conditions and stores or displays the signal from the balanced photodetector 130. Also shown in the diagram is a driver 110 for the optical phase shifter 106.

As stated above, the ultrasound sensor 100 employs the structure of a Michelson interferometer. The signal arm of the interferometer includes the beamsplitter 104, the polarization modulator 150, the focusing lens 112 and the probing fiber 120. The reference arm of the interferometer includes the beamsplitter 104, the optical phase shifter 106 and the mirror 108. The two outputs of the interferometer provide the two output beams 132, 134. Ultrasonic waves interacting with any part of the probing fiber 120 can cause a change in either the refractive index, the optical pathlength on part of the probing fiber 120 or both. This results in a phase change, or phase shift, in the signal arm. This phase shift is approximately proportional to the ultrasonic amplitude that induced the phase change. The above-referenced U.S. application Ser. No. 11/927,889 describes various embodiments of an ultrasonic sensor that may be employed as the ultrasound sensor 100. It has been shown that under certain conditions, the balanced photodetector 130 can produce an electric signal that is proportional to the ultrasonically induced phase shift in the probing fiber 120.

Figure 2:
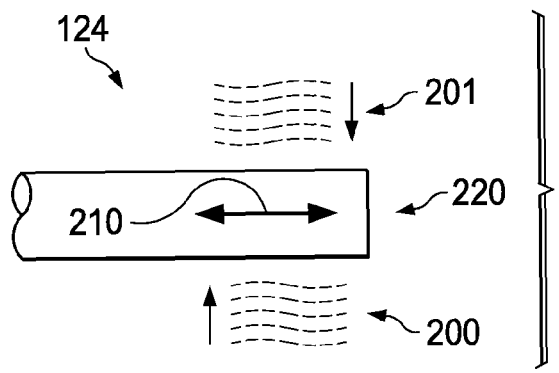
FIG. 2 is a diagram of one embodiment of a probing fiber illustrating at least some of the ways in which ultrasonic waves can be coupled thereto.

FIG. 2 is a diagram of one embodiment of a probing fiber (e.g., the probing fiber 120 of FIG. 1) illustrating at least some of the ways in which ultrasonic waves can be coupled thereto. For the purpose of explaining the coupling mechanism, the distal end 124 of the probing fiber 120 of sensor 100 is shown in greater detail. Ultrasonic waves 200 and 201 are coupled into the distal end 124 of the probing fiber 120 from the side, from directions that are approximately perpendicular to the longitudinal axis of the distal end 124 of the probing fiber 120. Ultrasound 200 and 201 causes a small amount of displacement and/or refractive index change in the core and cladding of the probing fiber 120. As a probing light 210 is shone on the distal tip 124 and then reflected by a coating 220, its optical phase is modulated by ultrasound 200 and 210 interacting with the distal tip 124.

One of the problems in using the sensor configuration of FIG. 2 is that the probing fiber tip 124, or any structure that it is embedded in, has its own vibration and thermal-elastic modes. An ultrasonic wave coupled into the probing fiber tip usually excites these modes that persist long after the initial passage of the ultrasonic wave. This is the reason that the detected signal usually contains ringing, or reverberations. The reverberations are highly undesirable, because they distort the frequency response of the sensor and smear the signal in time. In pulse-echo detection systems such as the IVUS imaging catheter, the reverberations can cause two types of image degradation. One is a decrease in longitudinal resolution of the echo image. The other is an extended ringdown zone in the image. "Ringdown zone" is a term commonly used in IVUS imaging to describe sensor reverberations in response to the ultrasonic excitation pulse. A large ringdown effect causes a region close to the catheter surface un-observable, because echo signals in that region are dominated by the noise from sensor reverberation.

Various conventional techniques exist to reduce the undesired reverberations in ultrasonic sensors. A common one involves the use of damping materials as backing layers in piezoelectric sensor construction. However, this and most other conventional techniques introduce complexity to a sensor structure which often limits its size and performance. Furthermore, the conventional techniques are not directly applicable to the fiber optic ultrasonic sensors.

FIGS. 3A and 3B are diagrams of one embodiment of an ultrasonic sensor in which reverberations are attenuated according to the principles of the invention. For purpose of discussion, only the signal arm of the sensor 100 is shown in this FIGS. 3A and 3B. In this embodiment, the sensor 100 measures the ultrasonic wave 200 in two stages, once using the configuration of FIG. 3A, and once using the configuration of FIG. 3B. The two stages may, of course, be repeated. The difference between the two sensor configurations is a change in the state of the polarization modulator 150.

The probing fiber 120 is a polarization-maintaining (PM) fiber, which means it has two principal polarization directions that are substantially different from each other. In the illustrated embodiment, the principal polarization directions are orthogonal to each other. Such PM probing fibers are commercially available from a number of vendors, for example, Nufern Incorporated of East Granby, Conn., USA, and Fibercore Ltd. of Southampton, UK. Light launched into a PM probing fiber at either one of its principal polarization directions will remain polarized at the same direction. In the signal arm of sensor 100, laser light 300 is polarized in a direction 301 which is parallel to one of the principal directions of the PM probing fiber 120. After the light passes through the polarization modulator 150, its polarization direction can remain in the direction 301, as is shown in FIG. 3A or can be changed to a substantially different (e.g., more than 10° or even substantially orthogonal) direction 302 which is substantially parallel to the other principal direction of PM probing fiber 120, as is shown in FIG. 3B. The polarization direction change can be implemented by using either an electro-optic crystal based modulator, a liquid crystal based modulator, or other polarization modulator as those skilled in the art understand. Laser light is coupled into the proximal end of the probing fiber 120 by the focusing lens 112. Because of the polarization-maintaining property of the probing fiber 120, laser light at the distal tip 124 remains polarized at the same direction as the proximal end. In FIG. 3A, the probing light at the distal tip has a polarization direction 301 that is of one relative orientation (i.e., substantially parallel in the specific embodiment of FIG. 3A) to the propagation direction of the ultrasound 200. Whereas in FIG. 3B, the probing light has a polarization direction 302 that is of a substantially different orientation (i.e., substantially perpendicular in the specific embodiment of FIG. 3B) to the propagation direction of the ultrasound 200. Because of this difference in topology, the response to the same ultrasound 200 by the sensor 100 is substantially dependent on the polarization state of the light in the probing fiber 120. However, the response of the sensor 100 to the vibration and thermal-elastic modes of the distal tip 124 is substantially independent of the polarization state of the light in the probe. One reason is that the vibration and thermal-elastic modes do not have a well-defined propagation direction and may be approximated as uniformly distributed. By generating the difference signal from the two measurements corresponding to FIG. 3A and FIG. 3B, the undesired sensor reverberation noise (which is predominantly common-mode) can be substantially cancelled, while the response to the ultrasound 200 is substantially preserved.

FIGS. 4A-C are diagrams illustrating a way in which noise can be reduced in the ultrasonic sensor of FIGS. 3A and 3B. More specifically, FIGS. 4A-C show an example of the responses from a prototype sensor 100, in a pulse-echo setup with a point-like reflector in the field. FIG. 4A shows the signal obtained when the probing light is polarized at a direction 301. FIG. 4B shows the signal obtained when the probing light is polarized at a substantially different (e.g., orthogonal) direction 302. In both cases a large initial signal is seen, representing the sensor's response to the excitation pulse (the ringdown zone). The subsequent response in time represents the echo signal from the point-like reflector in the field. In both cases a significant amount of reverberations in the echo signal is present. FIG. 4C shows the difference signal from the above two measurements. It can be seen in the difference signal that the ringdown zone is reduced, and that the echo waveform is substantially better-defined in time than before, indicating a substantial cancellation of the reverberation noise seen in FIGS. 4A and 4B.

Another benefit of the polarization-differential technique discussed here is that it can improve the directional response of the sensor 100. With a single polarization state at the tip 124 of the probing fiber 120, the sensor response amplitude will change significantly depending on the propagation direction of the ultrasound. The differential signal between two polarization states at the tip 124 will also have significant change in amplitude as the ultrasound direction is changed in the plane perpendicular to the longitudinal axis of the probing tip 124. Such ability to discriminate different directions can be useful for pulse-echo imaging applications.

FIG. 5 illustrates a flow diagram of one embodiment of a method of detecting an ultrasonic wave carried out according to the principles of the invention. The method begins in a start step 510. In a step 520, ultrasonic waves are coupled into a distal end of a probing fiber of an interferometer having a reference arm and a signal arm that includes the probing fiber. The probing fiber has a reflective coating at the distal end. In a step 530, laser light is provided to the interferometer. In a step 540, the interferometer produces two output beams based on the ultrasonic waves. In a step 550, electronic signals are generated based on the two output beams. The electronic signals are therefore based on the ultrasonic waves. In one embodiment, the electronic signals include a voltage signal proportional to a difference between the intensities of the two output laser beams from the interferometer. In a step 560, the polarization state of the laser light in the signal arm is modulated and the corresponding electronic signals are recorded. In a step 570, the ultrasonic sensor response is obtained by generating the difference of the signals recorded in step 560 that correspond to different polarization states of the light in probing fiber. The method ends in an end step 580.

FIG. 6 is a diagram of another embodiment of an ultrasonic sensor 600 constructed according to the principles of the invention. As will be explained below, the physics of the ultrasonic sensor 600 is such that it is sensitive to changes in the birefringence of the PM probing fiber 120 caused by ultrasonic pressure at its distal tip 124. In other words, the ultrasonic sensor 600 detects the difference between the ultrasonically induced phase shifts experienced by two light beams having different (e.g., orthogonal in some embodiments) polarization states. The ultrasonic sensor 600 has significantly similar noise reduction characteristics of the ultrasonic sensor 100 of FIG. 1 discussed above.

In the embodiment of FIG. 6, the ultrasonic sensor 600 is implemented as a polarization interferometer that detects any ultrasonic waves (for example, 200) present at the distal tip 124 of the PM probing fiber 120. A discussion of the general principles of a polarization interferometer in other contexts can be found, for example, in U.S. Pat. Nos. 6,243,200 and 6,498,680 and the references cited therein. In FIG. 6, a laser source 601 provides light to the interferometer. The light propagates in the forward direction through a series of optical components before being coupled into the PM probing fiber 120. A reflective coating at the PM probing fiber's distal tip 124 reflects the laser light, causing it to back-propagate toward the source 601. The back-propagating light is then deflected by two polarizing beam-splitters 617, 611 into two output beams that, in turn, are directed to two (unreferenced)

input ports of a balanced photodetector 630. The photodetector 630 produces an output signal 639 that is proportional to the difference in light intensities at its two input ports. The output signal 639 predominantly represents the detected ultrasonic pressure signal at the distal tip 124 of the PM probing fiber 120.

To help explain the operating principles of the sensor 600, FIG. 6 also shows a Cartesian coordinate system (X, Y and Z axis), where the Z axis is parallel to the forward propagating laser beam direction, and the XY plane is orthogonal to the Z axis. The light polarization states in the sensor 600 are also marked in the drawing, with the forward-propagating light polarizations noted at various locations as P1 to P7, and the back-propagating light polarizations noted at corresponding locations as Q7 to Q1. The polarization states can be represented by vectors in the XY plane, as FIGS. 7 and 8 illustrate.

FIG. 7 is a diagram of one embodiment of the polarization states of forward-propagating light at various locations in the ultrasonic sensor of FIG. 6. In FIG. 7, laser polarization (shown as P1) is shown to be linearly polarized in a horizontal direction (along the X axis). After propagating through a polarizing beam-splitter 611, the polarization state (shown as P2) remains horizontal. A magneto-optic component 613 (often called a Faraday rotator) rotates the polarization by about 45°, shown as the resulting polarization state P3. A half-wave plate 615 is oriented so that it returns the polarization to horizontal, shown as P4. After passing through another polarizing beam-splitter 617, the light remains polarized horizontally, shown as P5. The next component 650 is an electro-optic phase modulator, such as a $LiNbO_3$ crystal with proper electrodes attached and driven by a voltage source 660 to modulate the amount of its birefringence. The modulator 650 is oriented such that its optical axis (often referred to as the "fast" or "slow" axis) is about 45° with respect to the X axis. This causes the light polarization to become generally elliptical (shown as the location P6), as illustrated in FIG. 7. The ellipticity of the location P6 can be varied by modulator 650 and it is controlled by the applied voltage to the modulator. After passing through a focusing lens 612 and entering the PM probing fiber 120, light polarization at the location P7 remains generally elliptical.

The proximal end of the PM probing fiber 120 is oriented such that its two principal polarization axes are substantially parallel to the fast and slow axis of the modulator 650, respectively. The laser light propagates to the distal end 124 where it is reflected by a high reflectivity coating, and then back-propagated to the proximal end.

FIG. 8 is a diagram of one embodiment of polarization states of back-propagating light at various locations in the ultrasonic sensor of FIG. 6. As illustrated in FIG. 8, the back-propagating light's polarization Q7 is elliptical, with its ellipticity changed from that of the polarization P7 by an amount determined by the birefringence of the PM probing fiber 120. The back-propagating light is then collimated by lens 612, and its polarization state Q6 is unchanged from Q7. After back-propagating through the modulator 650, the light polarization state Q5 becomes circular. As explained above, this can be achieved by applying a proper voltage level to the modulator 650. The circularly polarized light Q5 is split by the polarizing beam-splitter 617, with the Y-polarization (vertical) component being deflected toward a pair of mirrors 631 and sent to one port (shown as "−" port in FIG. 6) of the balanced detector 630. The back-propagating light passing through the polarizing beam-splitter 617 is polarized horizontally, shown as Q4 in FIG. 8. After back-propagating through the half-wave plate 615, light polarization Q3 is at 45° (parallel to the polarization P3). However, after back-propagating through the Faraday rotator 613, light polarization Q2 is no longer parallel to the polarization P2. Q2 is in fact along the vertical direction (Y axis), because of the well-known nonreciprocal nature of the Faraday rotator. The vertically polarized light Q2 is substantially deflected by the polarizing beam-splitter 611 toward an input port of the balanced detector 630 (shown as the "+" port in FIG. 6). Since there is relatively little transmission of the back-propagating light through the polarizing beam-splitter 611, the light polarization Q1 is not shown in FIG. 8.

As pointed out previously, the control voltage to the modulator 650 is nominally set at a value such that the polarization state Q5 is substantially circular. When this condition is met, the balanced photodetector 630 receives substantially identical light intensities at its two input ports, so that the output 639 is substantially zero. This condition can be maintained, for example, by a control mechanism with an appropriate response time, typically much longer than the time period of ultrasonic waves. When there is ultrasonic pressure present at the distal end 124 of the PM probing fiber 120, the amount of birefringence in the PM probing fiber 120 is changed relatively rapidly according to the ultrasonic amplitude. This causes a rapid change in the polarization state Q5 of the returned light. In general Q5 can become elliptically polarized, with the ellipticity determined by the ultrasonic amplitude. Compared to the nominal circular polarization, the elliptically polarized Q5 will result in an increase in the light intensity at one input port of the detector 630, and a simultaneous decrease in the light intensity at the other input port of detector 630. This produces an output signal 639 which is substantially proportional to the ultrasonic amplitude at the distal end 124.

The sensor 600 also generally has the property of responding differently to ultrasonic waves 200 propagating at different angles in the XY plane. Such directional dependence of the response of the sensor 600 can be used to discriminate the echo signals returned from different directions in tissue, and hence can be useful in a pulse-echo imaging system. The pattern of this directional dependence (for example, the maximum response direction) can be altered by varying the polarization state of the light coupled into the PM probing fiber 120. Modifications to the sensor 600 can be made to allow light having a switchable polarization state launched into the PM probing fiber 120.

Those skilled in the art to which this application relates will appreciate that other and further additions, deletions, substitutions and modifications may be made to the described embodiments.

What is claimed is:

1. An ultrasonic sensor, comprising:
    an optical interferometer having an input and two outputs;
    a polarization-maintaining probing fiber having a reflective coating at a distal end thereof;
    a polarization modulator coupled between said input and a proximal end of said probing fiber; and
    a photodetector coupled to said two outputs and configured to derive an electronic signal that varies based on an ultrasonic signal received at said distal end.

2. The sensor as recited in claim 1 further comprising a coherent light source coupled to said input.

3. The sensor as recited in claim 1 further comprising an optical circulator configured to process light with respect to only one of said two outputs.

4. The sensor as recited in claim 1 wherein said two outputs provide light having substantially orthogonal polarizations.

5. The sensor as recited in claim 1 wherein said electronic signal has a diminished common-mode component.

6. The sensor as recited in claim 1 wherein said electronic signal is based on changes in amplitude caused by said ultrasonic signal.

7. The sensor as recited in claim 1 wherein said electronic signal is based on changes in phase caused by said ultrasonic signal.

8. The sensor as recited in claim 1 wherein said electronic signal is based on changes in direction caused by said ultrasonic signal.

9. A method of sensing an ultrasonic signal, comprising:
providing laser light to an input of an optical interferometer, said optical interferometer also having two outputs;
modulating a polarization state of said laser light;
causing said laser light to enter a polarization-maintaining probing fiber, reflect off a reflective coating at a distal end thereof; and
obtaining an electronic signal based on optical signals from said two outputs that represents an ultrasonic signal received at said distal end.

10. The method as recited in claim 9 further comprising generating said laser light.

11. The method as recited in claim 9 further comprising processing light with respect to only one of said two outputs.

12. The method as recited in claim 9 wherein said two outputs provide substantially orthogonal polarizations of said laser light.

13. The method as recited in claim 9 wherein said electronic signal has a diminished common-mode component.

14. The method as recited in claim 9 wherein said electronic signal is based on changes in amplitude caused by said ultrasonic signal.

15. The method as recited in claim 9 wherein said electronic signal is based on changes in phase caused by said ultrasonic signal.

16. The method as recited in claim 9 wherein said electronic signal is based on changes in direction caused by said ultrasonic signal.

17. An ultrasonic sensor, comprising:
an optical interferometer having an input, a reference arm, a signal arm and two outputs;
a polarization-maintaining probing fiber having a reflective coating at a distal end thereof;
a focusing lens coupled to said signal arm;
a polarization modulator coupled between said input and a proximal end of said probing fiber; and
a photodetector coupled to said two outputs configured to provide light having substantially orthogonal polarizations, said photodetector configured to derive an electronic signal that varies based on an ultrasonic signal received at said distal end.

18. The sensor as recited in claim 17 further comprising a coherent light source coupled to said input.

19. The sensor as recited in claim 17 further comprising an optical circulator configured to process light with respect to only one of said two outputs.

20. The sensor as recited in claim 17 wherein said electronic signal has a diminished common-mode component.

21. The sensor as recited in claim 17 wherein said electronic signal is based on changes in amplitude caused by said ultrasonic signal.

22. The sensor as recited in claim 17 wherein said electronic signal is based on changes in phase caused by said ultrasonic signal.

23. The sensor as recited in claim 17 wherein said electronic signal is based on changes in direction caused by said ultrasonic signal.

* * * * *